United States Patent
Harazim

(10) Patent No.: US 6,530,226 B1
(45) Date of Patent: Mar. 11, 2003

(54) MULTISTEP STEAM POWER OPERATING METHOD FOR GENERATING ELECTRIC POWER IN A CYCLE AND DEVICE FOR THE IMPLEMENTATION THEREOF

(75) Inventor: Wolfgang Harazim, Werdauer Strasse 124, D-08060 Zwickau (DE)

(73) Assignees: Rerum Cognitio, Zwickau (DE); Wolfgang Harazim, Zwickau (DE)

( * ) Notice: Subject to any disclaimer, the term of this patent is extended or adjusted under 35 U.S.C. 154(b) by 0 days.

(21) Appl. No.: 09/555,961
(22) PCT Filed: Dec. 9, 1998
(86) PCT No.: PCT/DE98/03617
§ 371 (c)(1), (2), (4) Date: Jul. 26, 2000
(87) PCT Pub. No.: WO99/30018
PCT Pub. Date: Jun. 17, 1999

(30) Foreign Application Priority Data

| Dec. 9, 1997 | (DE) | 197 54 660 |
| Jan. 28, 1998 | (DE) | 198 03 049 |
| Jan. 28, 1998 | (DE) | 198 03 048 |
| Apr. 1, 1998 | (DE) | 198 14 510 |
| Sep. 24, 1998 | (DE) | 198 43 848 |

(51) Int. Cl.$^7$ ................................................ F02C 3/30
(52) U.S. Cl. ........................... 60/775; 60/784; 60/787; 60/39.17
(58) Field of Search .................. 60/39.05, 39.07, 60/39.142, 39.17, 39.511, 39.52

(56) References Cited

U.S. PATENT DOCUMENTS

| 4,148,185 A | 4/1979 | Somers | |
| 5,177,952 A | 1/1993 | Stone | |
| 5,331,806 A | 7/1994 | Warkentin | |
| 5,809,768 A * | 9/1998 | Uematsu et al. | 60/39.465 |
| 5,953,900 A * | 9/1999 | Bannister et al. | 60/39.05 |
| 6,038,848 A * | 3/2000 | Frutschi | 60/39.05 |
| 6,199,363 B1 * | 3/2001 | Frutschi et al. | 60/39.05 |

FOREIGN PATENT DOCUMENTS

WO 9706352 2/1997

OTHER PUBLICATIONS

Patent Abstracts of Japan, Pub. No. 09004418, Pub. Date Jul. 1, 1997.
Patent Abstracts of Japan, Pub. No. 09144559, Pub. Date Mar. 6, 1997.
Patent Abstracts of Japan, Pub. No. 09151750, Pub. Date Oct. 6, 1997.
"Weiterentwicklung Des $H_2/O_2$–Dampfprozesses (Brennkammer Und Hochtemperaturbine)" By Jericha, Et. Al., VGB Kraftwerkstechnik, 73 (1993) Sep., No. 9, Essen, DE.

* cited by examiner

Primary Examiner—Charles G. Freay
(74) Attorney, Agent, or Firm—Liniak, Berenato & White

(57) ABSTRACT

The aim of the invention is to further improve the closed cycle for generating electric power in such a way that efficiency is enhanced and general pressure and temperature requirements regarding the working fluid used are substantially reduced. The invention also seeks to provide an improved technical solution that meets the requirements of continuos operation at rated output despite fluctuations in load requirements. This is achieved through a multistep steam power operating method for generating electric power in a cycle by using an additional gaseous energy carrier to increase the pressure, the temperature and the volume of the working fluid in the cycle and by recirculating the working fluid in the cycle in such a way that continuously overheated steam is used as a working fluid. The invention can be used in the generation of electric power in a cycle.

8 Claims, 2 Drawing Sheets

US 6,530,226 B1

MULTISTEP STEAM POWER OPERATING METHOD FOR GENERATING ELECTRIC POWER IN A CYCLE AND DEVICE FOR THE IMPLEMENTATION THEREOF

The present application is filed under 35 U.S.C. 371 claiming the benefit of PCT application PCT/DE98/03617 filed on Dec. 9, 1998.

BACKGROUND OF THE INVENTION

1) Field of the Invention

The invention relates to a multi-stage steam-power/working process for the generation of electric energy in a cycle by the use of an additional gaseous energy carrier for increasing the pressure, temperature and mass of the working fluid in the power process and for the recirculation of the working fluid in the working process.

Such a technical solution is primarily required in the area of power economy.

2) Discussion of the Relate Art

During the conversion of thermal energy into mechanical energy, the efficiency is limited to maximum values which are determined by the temperatures of the combustion, of the exhaust gas released during the combustion and of the coolants used. Material limits in the energy-conversion processes applied influence the difference between the theoretically attainable efficiency and the practically realized efficiency according to the respective prior art. Since turbomachine research has already reached a very high level of development, possible marked improvements result essentially from the thermodynamics of the cycles.

Starting from the maximum combustion temperatures, the general temperatures in the energy-conversion process, according to the previous level of knowledge, have to be increased in order to increase the exergy portion.

In addition, when fossil fuels are used in the gas-turbine process, the high combustion temperatures have an effect on the emission of nitric oxide.

For the generation of electric energy, the steam-turbine Rankine cycle, the gas-turbine cycle and the gas-and-steam combined process (CCPP process) as the combination of both basic processes have proved successful on a large scale.

By means of modern steam-power processes, the intended improvements in efficiency are to be achieved by pressure and temperature increases of the working fluid to over 300 bar and over 700° C. At the same time, this requires solutions in terms of materials for coping with these process parameters.

By means of modern gas-turbine processes, the aim is to increase the turbine application temperatures to over 1500° C. and to obtain the stability of the material used by adequate technical solutions for machine cooling.

In known gas-and-steam combined processes (CCPP), benefits are obtained from technical developments in the fields of both basic processes.

In the effort to achieve the improvements in efficiency aimed at in the conversion of energy, attempts have been made to find solutions for the most favorable configuration of the energy-conversion processes by utilizing cycles.

Thus, U.S. Pat. No. 3,841,100 describes a closed gas-turbine process, using various gases, such as air, hydrogen, helium or other gases, in which the working process takes place in a turbocompressor and the power process takes place in a gas turbine. In this case, the intended improvement in efficiency is to be achieved through the use of an extremely large coolant reservoir, by means of which the improved cooling capacity of ambient air during the night-time can be utilized. At the same time, the continuous operation of the plant at rated load is to be ensured. This illustrates the great technical efforts which are made in order to obtain relatively small improvements in efficiency.

The object of the invention is therefore to develop the closed cycle for generating electric energy in such a way that the shortcomings of the known prior art are overcome and at the same time improvements in efficiency can be achieved. The general temperature and pressure requirements of the working fluid used are to be markedly reducible compared with known techniques.

At the same time, despite fluctuating load requirements, the aim is to provide the technical solution to be developed with the prerequisites for continuous operation under rated load.

SUMMARY OF THE INVENTION

According to the invention, a multi-stage steam-power and steam working process for the generation of electric energy in a cycle by the use of an additional gaseous energy carrier for increasing the pressure, temperature and mass of the working fluid in the cycle and for the recirculation of the working fluid in the cycle is configured in such a way that continuously superheated steam is used as a working fluid.

With this selection of the working fluid, the favorable properties of the steam with regard to the specific heat, with regard to the specific pressure losses and with regard to the coefficient of heat transfer can be utilized.

The power process is carried out in a closed multi-stage gas-turbine plant, the steam used, in the superheated form applied, exhibiting an increasingly gas-like behavior.

The working fluid is stored as condensate before start-up and after shutdown in a working-fluid storage vessel arranged between the prime mover and the driven machine. To this end, this working-fluid storage vessel equipped with technical means for evaporating the condensate or for cooling the steam as and when required.

Furthermore, the proposed technical solution is characterized in that the conversion of the stored energy of the working fluid and of the additionally used gaseous energy carrier into mechanical energy is carried out by means of a closed gas-turbine plant. The cycle is maintained by the use of hydrogen and oxygen as additional gaseous energy carrier and the resulting steam from the oxyhydrogen gas reaction taking place in the gas turbine.

The additional vaporous working fluid resulting from the internal combustion of the hydrogen and oxygen used is used as superheated steam for the purpose of increasing the pressure, temperature and mass of the entire working fluid directly at the blading of the multi-stage gas turbine. Due to the shifting of the oxyhydrogen gas reaction into the individual stages of the multi-stage gas turbine, the high pressures and temperatures resulting in the process, with minimum transfer losses, are utilized for the power process without the general pressure and temperature levels in the entire cycle having to be maintained.

After the expansion in the gas turbine, the superheated steam used is fed as working fluid together with the superheated steam as the conversion product from the controlled oxyhydrogen gas reaction to the compression stage of the cycle.

It is essential to the invention that the thermal energy of the expanded gas-turbine exhaust steam is used by means of heat exchanger for pre-superheating the compressed superheated steam as working fluid. In this case, the desirable cooling of the working fluid is effected at the same time before it is used in the intended turbocompressor.

Substantial portions of the cooling tasks in the cycle are therefore covered by the heat exchange between the expanded working fluid of high temperature and the compressed working fluid of low temperature.

In one embodiment of the invention, the working fluid between the prime mover and the driven machine is evaporated in a working-fluid storage vessel by the external supply of energy before start-up of the plant. In this case, the working fluid in the working-fluid storage vessel is in the form of steam condensate.

In another embodiment, provision is made for the excess working fluid, which approximately corresponds to the quantity of the steam produced from the combustion reaction of hydrogen and oxygen, to be extracted from the cycle between the prime mover and the driven machine.

In principle, the entire cycle is thus suitable for the discharge of excess working fluid, in which case, in accordance with the actual requirements for the efficient utilization of the extracted working fluid, for example for heating purposes, the compressed steam used for the turbine cooling may also be removed from the cycle.

It is also possible to use excess portions of the electric energy generated in the cycle for producing hydrogen and oxygen. This is especially suitable if, despite reduced load requirements, the cycle is maintained under rated load in the interest of utilizing the highest possible efficiencies.

Provision is likewise made for tapped portions of the working fluid in the form of steam from the compression stage of the cycle to be used for the purpose of cooling the shaft and the blades of the gas turbine.

In summary, the advantages of the proposed solution in terms of the method consist in the fact that, while avoiding air pollutants from the cycle, continuous operation can be carried out with superheated steam as working fluid without having to forego the known technical advantages of the gas-and-steam combined process. In addition, the advantage consists in the fact that the general pressure and temperature levels in the closed cycle are markedly reduced compared with comparable technical plants. This permits more cost-effective machine solutions, which in addition may have increased fatigue strength. In addition, the advantageous physical properties of superheated steam are crucial prerequisites for comparatively small specific dimensions of the plant components, such as driven machine and prime mover, connecting pipelines or heat-exchanger areas.

The proposed arrangement for carrying out the multi-stage steam-power and steam-working process according to the method described consists of a multi-stage gas turbine as prime mover and a multi-stage turbocompressor, arranged on the turbine shaft, as driven machine, and of the connecting pipelines for the circulation of the working fluid.

In this case, feed devices for gaseous hydrogen and gaseous oxygen are arranged at the individual turbine stages in the direct vicinity of the blading.

A heat exchanger serving to transfer heat from the expanded turbine exhaust steam to the compressed working fluid is arranged between the driven machine and the prime mover.

In addition, a working-fluid storage vessel is arranged between the driven machine and the prime mover. Such heat-exchanger areas serving to cool the compressed working fluid are likewise arranged in the individual stages of the turbocompressor plant.

In a special embodiment of the arrangement for carrying out the multi-stage steam-power and steam-working process, an evaporation plant serving for the plant start-up and intended for the working fluid is arranged in the working-fluid storage vessel.

A further embodiment of the arrangement for carrying out the multi-stage steam-power and steam-working process provides for a working-fluid extraction device serving to regulate a constant mass flow for the compression unit to be arranged between prime mover and driven machine.

An energy-conversion plant provided with said features is characterized by a number of advantages. Due to the exclusive use of superheated steam as working fluid, the known physical advantages of this working fluid can be utilized for the simple and cost-effective configuration of the requisite plant components for performing the cycle.

The direct arrangement of the feed devices for gaseous hydrogen and gaseous oxygen at the blading of the individual stages of the gas turbine enable undesirable load peaks to be largely eliminated and the requisite high pressure and temperature resistance of the plant components used to be restricted to the corresponding turbine stages.

In addition, the uniform use of superheated steam as working fluid for the cycle enables the advantageous characteristics of the working fluid to be utilized for the arrangement of heat-exchanger areas of comparatively small dimensions.

It may also be regarded as an advantage that the components serving to cool the units, to store the working fluid and to remove the working fluid are to be designed solely for the use of superheated steam or steam condensate.

The proposed solution on the whole thus offers the prerequisite for providing compact energy-conversion plants of high energetic efficiency at a comparatively low specific machine cost.

BRIEF DESCRIPTION OF THE DRAWINGS

The invention is to be explained in more detail below with an exemplary embodiment. In the attached drawing.

DETAILED DESCRIPTION OF THE PREFERRED EMBODIMENT

Exemplary Embodiment

Figure 1:
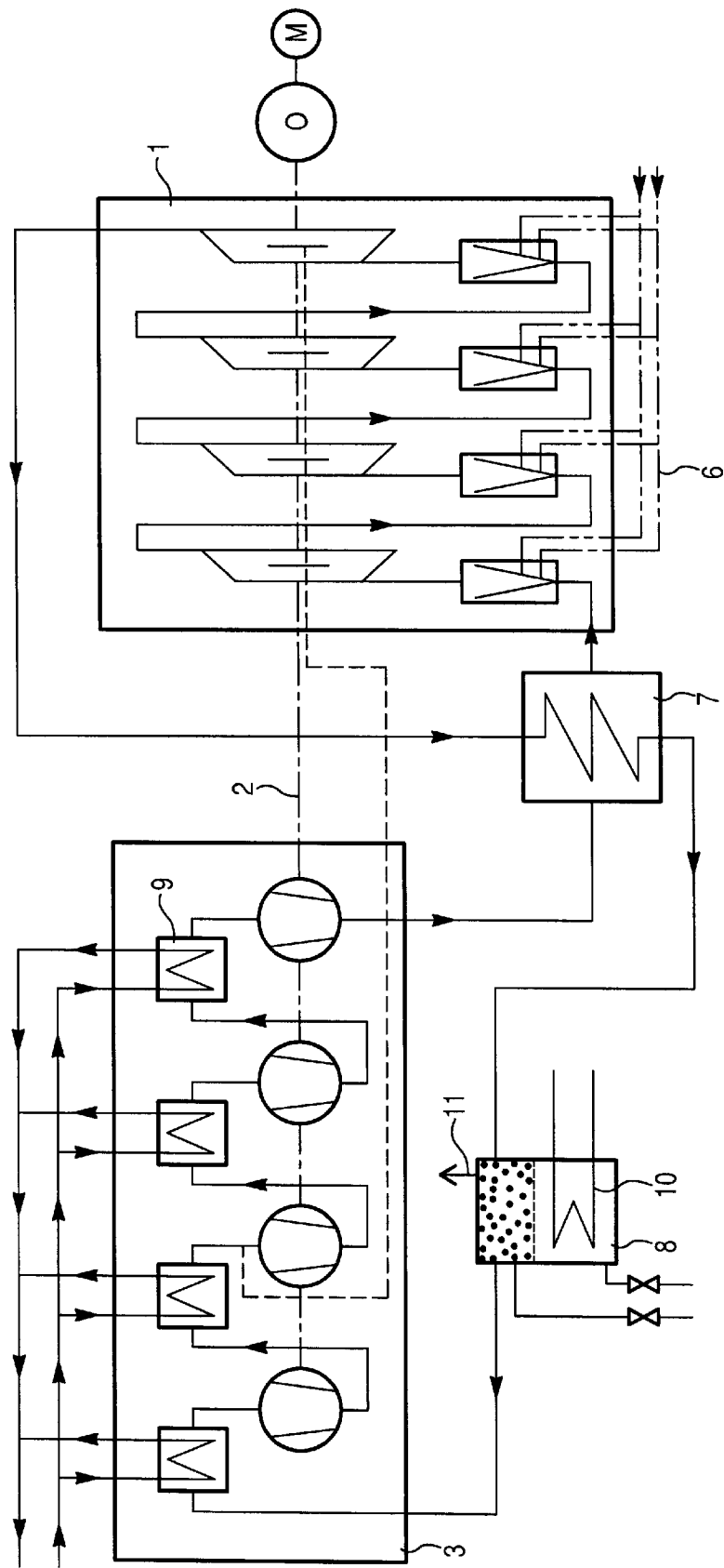
FIG. 1 shows a schematic block diagram of the components of a cycle with a four-stage turbocompressor, a four-stage gas turbine, a heat exchanger for the working fluid and a working-fluid storage vessel.
Figure 2:
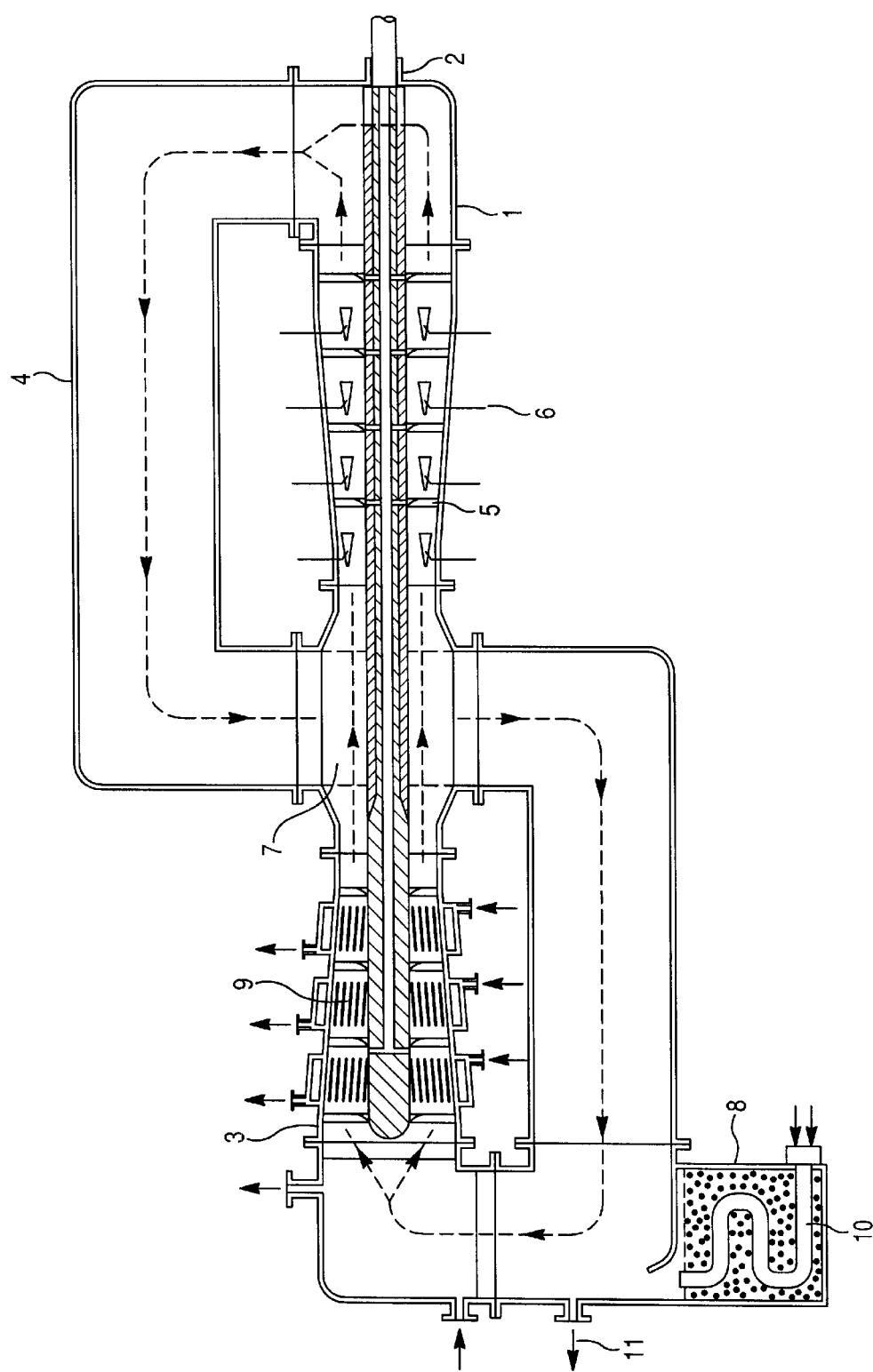
FIG. 2 shows the schematic longitudinal section through an energy-conversion plant for the generation of electric energy in the cycle, with a four-stage turbocompressor arranged on the shaft of a four-stage gas turbine.

Electric energy is to be generated in the closed cycle in an energy-conversion plant, consisting of a multi-stage gas turbine 1 and a turbocompressor 3.

To this end, first of all the steam condensate contained in a working-fluid storage vessel 8 is to be evaporated by means of an evaporation plant 10 by the supply of external energy.

Externally stored gaseous hydrogen and externally stored gaseous oxygen is fed via corresponding feed devices 6 directly to the blading 5 of the individual turbine stages of the gas turbine 1, which is of four-stage design in this case. The superheated steam produced, as a conversion product of the oxyhydrogen gas reaction, is fed together with the superheated steam from the evaporation of the contents of the working-fluid storage vessel 8 to the four-stage turbocompressor 3 arranged on the turbine shaft 2. The individual compressor stages are cooled by the use of coolant. The compressed steam, as working fluid, after leaving the turbocompressor 3, is pre-superheated in a heat exchanger 7 by the expanded steam leaving the gas turbine 1 and is then fed to the gas turbine 1, in which, directly at the blading of the individual turbine stages, the local further superheating and the partial pressure increase are effected by the combustion reaction of the hydrogen and oxygen used there. In this case, the cooling of the turbine shaft 2 and of the turbine blading 5 is ensured by portions of the steam tapped from the compressor stage. The intimate mixture of the working fluid in the form of superheated steam containing portions from the evaporated steam condensate from the working-fluid storage vessel 8 and from the steam produced during the oxyhydrogen gas reaction is introduced into the connecting pipelines between gas turbine 1 and turbocompressor 3 and is cooled when flowing through the heat exchanger 9 by the cooled working fluid compressed by the turbocompressor 3.

To regulate the mass flow of the working fluid fed to the turbocompressor 3, a working-fluid extraction device 11 is provided, by means of which working fluid, for example for external heat utilization, is extracted from the process to the extent of the steam additionally introduced.

Such a task is performed at least partly by the possible discharge of the steam used for cooling purposes in the gas turbine 1.

Finally, the coolant fed to the turbocompressor 3 is also used for external heat utilization, so that an improved efficiency compared with conventional energy-conversion plants is achieved overall. On account of the uniform use of superheated steam of comparatively low pressure and comparatively low temperature, the machine requirements imposed on the components of the cycle are kept within controllable limits.

LIST OF DESIGNATIONS

1 Multi-stage gas turbine
2 Turbine shaft
3 Turbocompressor
4 Connecting pipelines
5 Blading
6 Feed devices for gaseous hydrogen and oxygen
7 Heat exchanger between turbine exhaust steam and compressed working fluid
8 Working-fluid storage vessel
9 Heat-exchanger areas in the turbocompressor
10 Evaporation plant
11 Working-fluid extraction device

What is claimed is:

1. A Multi-stage steam-power/working process for the generation of electric energy in a cycle by using an additional gaseous energy carrier for increasing pressure, temperature and mass of a working fluid in the power/working process and for recirculation of the working fluid in the power/working process, the process comprising the following steps:

continuously using steam as said working fluid,
performing the cycle in a closed multi stage gas-turbine plant,
storing the working fluid as a condensate before start-up and after shutdown between a prime mover and a driven machine in a working-fluid storage vessel,
converting stored energy of the working fluid and of the additional gaseous energy carrier into mechanical energy using said closed gas-turbine plant,
utilizing an oxyhydrogen gas reaction to produce a conversion product and using said conversion product as an additional vaporous working fluid,
combusting hydrogen and oxygen and using additional vaporous working fluid resulting from combusting said hydrogen and oxygen for increasing the pressure, temperature and mass of the working fluid directly at a blading stage of the closed multi-stage gas turbine plant,
feeding steam as the working fluid together with the conversion product from the oxyhydrogen gas reaction to a compression stage of the cycle, and
using thermal energy of expanded gas-turbine exhaust steam to pre-superheat the the working fluid after being compressed.

2. The Multi-stage steam-power/working process according to claim 1, further comprising the additional step of:

evaporating the working fluid between driven machine and prime mover by supplying energy before start-up.

3. The Multi-stage steam-power/working process according claim 1, further comprising the following step of:

extracting excess working fluid, which corresponds to a quantity of steam produced from the oxyhydrogen gas reaction from the cycle between the prime mover and the driven machine.

4. The Multi-stage steam-power/working process according to claim 1, further comprising the step of:

utilizing excess electric energy generated to produce hydrogen and oxygen.

5. The Muiti-stage steam-power/working process according to claim 1, further comprising the step of:

using tapped steam from a compression stage of the cycle to cool a shaft and blade members of a gas turbine.

6. An Arrangement for carrying out the multi-stage steam-power /working process according to claim 1, said arrangement comprising a multi-stage gas turbine (1) as said prime mover and a multi-stage turbocompressor (3) arranged on a turbine shaft (2), wherein feed devices (6) for gaseous hydrogen and gaseous oxygen are arranged at individual turbine stages in direct vicinity of the blading stage (5), a combustor for combusting oxygen and hydrogen, a heat exchanger (7) disposed to transfer heat from the expanded gas-turbine exhaust steam to the compressed working fluid is arranged between the driven machine (3) and the prime mover (1), the working fluid storage vessel (8) is arranged between the driven machine (3) and the prime mover (1), and heat-exchanger areas (9) serving to cool the compressed working fluid are arranged in individual stages of the closed multi stage gas-turbine plant (3).

7. The Arrangement for carrying out the multi-stage steam-power /working process according to claim 6, further comprising:

an evaporation plant (10) is arranged in the working-fluid storage vessel (8).

8. The Arrangement for carrying out the multi-stage steam-power/working process according to claims 6, further comprising:

a working fluid extraction device (11) serving to regulate a constant mass flow for a compression unit (3) arranged the between driven machine (3) and the prime mover (1).

* * * * *